Figure 3:

No. 883,772.  PATENTED APR. 7, 1908.
W. D. ARMSTRONG.
ANIMAL TRAP.
APPLICATION FILED JAN. 26, 1907.
2 SHEETS—SHEET 1.
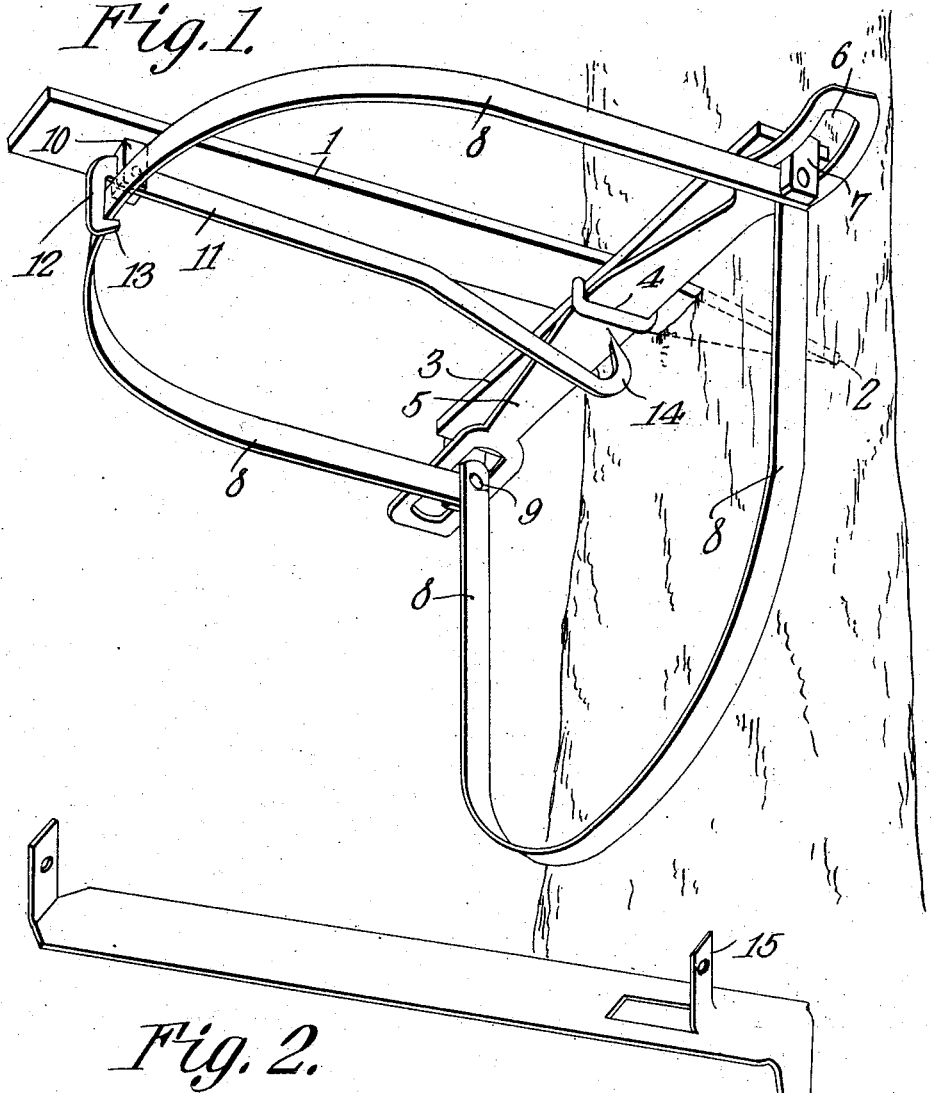
WITNESSES:
William D. Armstrong, INVENTOR
By C. A. Snow & Co.
ATTORNEYS
THE NORRIS PETERS CO., WASHINGTON, D. C.

No. 883,772. PATENTED APR. 7, 1908.
W. D. ARMSTRONG.
ANIMAL TRAP.
APPLICATION FILED JAN. 26, 1907.

2 SHEETS—SHEET 2.

WITNESSES: William D. Armstrong, INVENTOR.

By C. A. Snow & Co.

ATTORNEYS

UNITED STATES PATENT OFFICE.

WILLIAM DAVIS ARMSTRONG, OF ABINGDON, ILLINOIS.

ANIMAL-TRAP.

No. 883,772.      Specification of Letters Patent.      Patented April 7, 1908.

Application filed January 26, 1907. Serial No. 354,297.

*To all whom it may concern:*

Be it known that I, WILLIAM DAVIS ARMSTRONG, a citizen of the United States, residing at Abingdon, in the county of Knox and State of Illinois, have invented a new and useful Animal-Trap, of which the following is a specification.

This invention relates to animal traps and more particularly to devices of this character for use upon the limbs of trees, upon stumps and in fact wherever it is desirable to fasten the trap at an elevated point.

The object of the invention is to simplify the construction of traps of this character and to facilitate securing them at desired points upon trees, etc.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view showing the trap secured to a portion of a tree; Fig. 2 is a detail view of a modified form of holding means adapted to be used in connection with other forms of traps such as employ rectangular wooden bases; and Fig. 3 is a detail view of another form of trap.

Referring to the figures by characters of reference, 1 is a longitudinally extending spike standard having a pointed end 2 adapted to be driven into a tree or other suitable support after the manner of a spike. Secured upon the standard near the tapered end thereof is a base 3 the same being preferably fastened thereto by means of a yoke 4 which may be riveted or otherwise held upon the standard. This yoke also clamps a bow spring 5 upon the cross strip and this spring has elongated slots 6 in the end portions thereof through which normally project ears 7 extending downward from the ends of the base. These slots are of sufficient width to receive therebetween the ends of bowed strips 8 which overlap and are pivoted as at 9 to the ears. These strips 8 constitute the jaws of the trap and when the trap is closed one of the jaws is adapted to fit snugly within the other. Ears 10 extend from the standard near one end and pivoted between them is an arm 11 having a finger 12 extending downward therefrom and provided with a projection 13 for overlapping one of the jaws 8, said finger and projection constituting a trigger. The arm 11 extends longitudinally below the standard and terminates below the spring 5 in a bait hook 14. It is of course understood that when the parts are in their normal positions the jaws overlap throughout their lengths and are embraced at their lower ends by the slotted portions of spring 5. In using the trap the point 2 is driven into a support and one of the jaws 8 is swung upward so as to tension spring 5 and said jaw is held in place by means of the trigger upon the arm 11. Bait is of course placed on the hook 14. As it is impossible for an animal to reach up to the bait except past the hanging jaw 8 it will be obvious that as soon as the raised jaw is sprung by a pull on the bait hook said jaw will swing down and grip the animal.

Instead of extending the point 2 in alinement with the strip 1 the same may be bent at any desired angle as shown at 16 in Fig. 2 and by driving said point into a support both jaws 8 can be swung toward the standard.

Instead of using the form of trap shown in Fig. 1 any preferred form of trap, such as those utilizing wooden bases with a spring jaw thereon, may be employed in which event the standard is provided with upturned ears 15 as shown in Fig. 2, said ears being fastened to opposite ends of the base. In Fig. 3 I have shown a modified form of trap in which the base 17 is extended at one end beyond the bow spring of the trap and pointed like a spike so that it can be driven into a tree or other support instead of the standard 1, as shown in Fig. 1. When the trap is fastened in this manner both jaws can be swung upward and one of them held by the trigger as heretofore described. When an animal reaches up to remove the bait from the hook 14 the trigger releases the jaw engaged thereby and both jaws are swung downward so as to grip upon the neck of the animal and hold it. Considerable importance is attached to the use of pointed members inasmuch as the provision of these devices enables the trap to be readily secured at any desired point upon trees, stumps, etc., without the use of nails, etc., and said fastener is of sufficient strength to prevent an entrapped animal from pulling it out of the position to which it is secured.

What is claimed is:

1. The combination with a pointed support engaging device; of jaws pivotally connected to and extending from said device and disposed to move in a plane extending transversely of said device, said device extending across and out of the path of the jaws.

2. In a trap the combination with crossed members rigidly connected, one of said members having a pointed support-engaging end; of jaws connected to said pointed member, and means upon the other member for locking the jaws when set, said jaws being movable in a plane extending transversely of the pointed member.

3. A trap comprising crossed members, one of said members being in the form of a spike and having a pointed support-engaging end, a bow spring upon one of the members, a yoke embracing said member and the spring and engaging the other member to bind said members and the spring together, jaws pivotally connected to the pointed member and disposed to be embraced and actuated by the ends of the spring, and a trigger upon one of the members for locking one of the jaws set, said jaws being movable in a plane extending transversely of the member.

In testimony that I claim the foregoing as my own, I have hereto affixed my signature in the presence of two witnesses.

WILLIAM DAVIS ARMSTRONG.

Witnesses:
W. A. THOMAS,
AMY DONAHO.